(12) United States Patent
Matsushima (10) Patent No.: US 6,377,331 B1
(45) Date of Patent: Apr. 23, 2002

(54) FILM IMAGE READ APPARATUS, CONTROL METHOD THEREFOR, IMAGE PROCESSING APPARATUS, IMAGE PROCESSING METHOD, AND STORAGE MEDIUM

(75) Inventor: Hiroshi Matsushima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/158,473

(22) Filed: Sep. 22, 1998

(30) Foreign Application Priority Data

Sep. 25, 1997 (JP) .............................................. 9-260041

(51) Int. Cl.[7] ........................ G03B 27/52; G03B 27/42; H04N 1/27
(52) U.S. Cl. ........................ 355/40; 396/311; 396/319; 358/487; 358/506
(58) Field of Search ........................... 348/96–104, 110, 348/111; 358/505, 506, 487; 355/40; 396/319, 311, 234

(56) References Cited

U.S. PATENT DOCUMENTS

| | | | |
|---|---|---|---|
| 4,974,096 A | * | 11/1990 | Wash .......................... 355/40 |
| 5,493,355 A | * | 2/1996 | Kazami ....................... 396/319 |
| 5,748,287 A | * | 5/1998 | Takahashi et al. ............. 355/40 |
| 5,872,643 A | * | 2/1999 | Maeda et al. ........... 358/506 X |
| 5,959,665 A | * | 9/1999 | Hibino et al. .................. 348/96 |

* cited by examiner

Primary Examiner—Alan A. Mathews
(74) Attorney, Agent, or Firm—Morgan & Finnegan, LLP (57) ABSTRACT

It is an object of this invention to provide a film image read apparatus which allows a monitor to reproduce a film image in accordance with the intention of the photographer. To achieve this object, there is provided an apparatus including an information read circuit for reading predetermined information, other than image information, which is recorded on a film, an image read circuit for reading an illuminated film image, a metering circuit for metering the illuminated film image, a switching circuit for switching metering areas of the metering means for the film image, and a control circuit for controlling the switching means to switch the metering areas for the film image in accordance with the read information.

24 Claims, 8 Drawing Sheets

FILM IMAGE READ APPARATUS, CONTROL METHOD THEREFOR, IMAGE PROCESSING APPARATUS, IMAGE PROCESSING METHOD, AND STORAGE MEDIUM

BACKGROUND OF THE INVENTION

The present invention relates to a film image read apparatus which allows a monitor such as a TV set or personal computer to display a photographic image on a film having a recording portion for recording data other than image data.

Recently, cameras for taking photographs by using IX240 films and the like, which have magnetic recording portions, have come into widespread use. Various film read apparatuses for reading images on developed films and displaying them on monitors and the like have also been proposed.

In such a conventional film image read apparatus, regardless of the metering mode in which the camera used for photographing operation was set, a film image in a specific area is measured to adjust the electronic shutter of the CCD, the iris, and the gain.

In the above conventional film image read apparatus, however, if the metering scheme of the apparatus differs from that of the camera used for photographing operation, an object image looking good on a film may not look right on a monitor.

Figure 8:
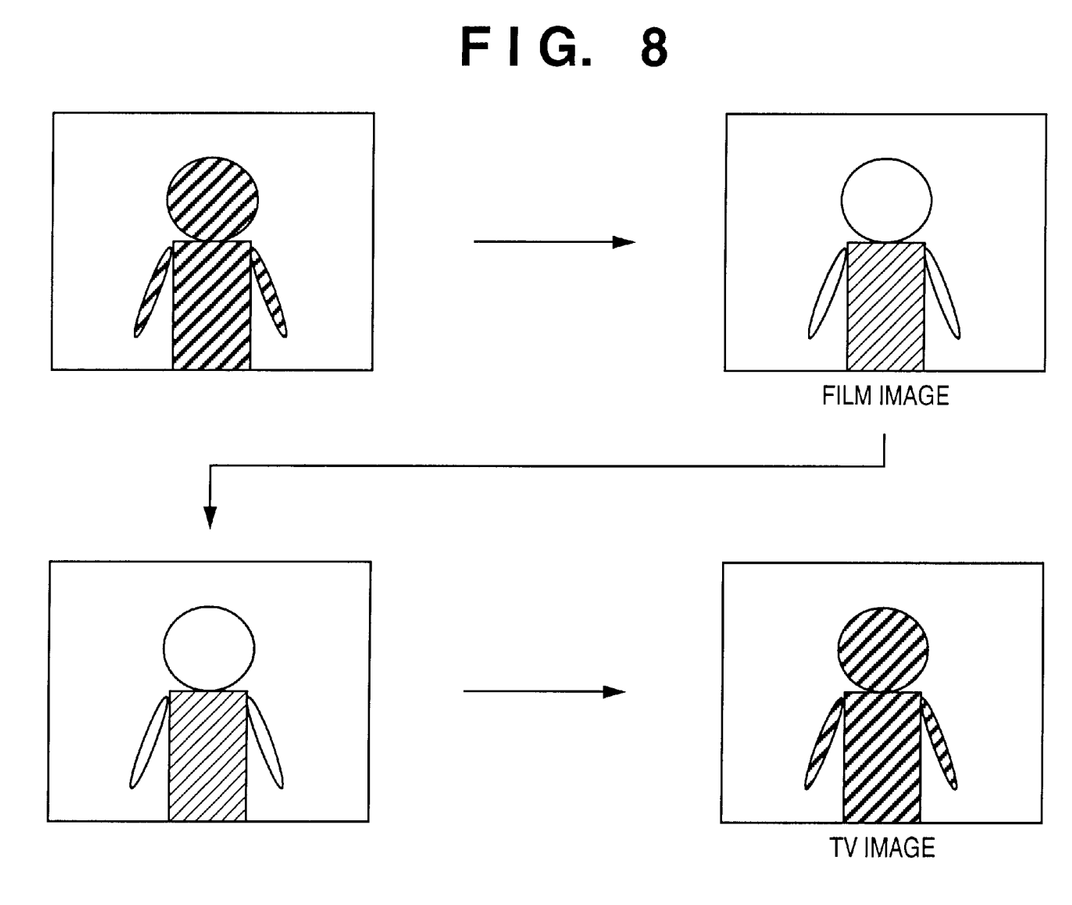
FIG. 8 is a view showing a problem experienced when the metering scheme of the apparatus differs from that of the camera used for photographing operation.

Assume that the camera performs partial metering for an object in a backlight condition, the appropriately exposed film image is read by the CCD with averaging metering, and the film image read with average metering is displayed on the monitor. In this case, a dark object image is displayed as if the object in the backlight condition was photographed with averaging metering. FIG. 8 shows this state.

Referring to FIG. 8, reference symbol (a) denotes the image displayed on the finder of the camera, and (b) and (c), the film images obtained by appropriately photographing the object upon backlight correction. Since correction is performed in accordance with the object, the background is very bright. Reference symbol (d) denotes the image obtained by reading the film image data by the CCD with averaging metering. This object image is underexposed.

SUMMARY OF THE INVENTION

The present invention has been made to solve the above problems, and has as its object to provide a film image read apparatus which allows a monitor to reproduce a film image in accordance with the intention of the photographer, a control method therefor, an image processing apparatus, an image processing method, and a storage medium.

To solve the above problems and achieve the above object, a film image read apparatus of the present invention, according to its first aspect, is characterized by comprising:
information read means for reading predetermined information, other than image information, which is recorded on a film, image read means for reading an illuminated film image, metering means for metering the illuminated film image, switching means for switching metering areas of the metering means for the film image, and control means for, when the read predetermined information includes metering mode information for photographing operation, controlling the switching means to switch the metering areas for the film image in accordance with the metering mode information.

A film image read apparatus of the present invention, according to its second aspect, is characterized by comprising:
information read means for reading predetermined information, other than image information, which is recorded on a film, image read means for reading an illuminated film image, metering means for metering the illuminated film image, switching means for switching metering areas of the metering means for the film image, and control means for, when the read predetermined information includes flash information indicating whether flash means was used in photographing operation, controlling the switching means to switch the metering areas for the film image in accordance with the flash information.

A film image read apparatus of the present invention, according to its third aspect, is characterized by comprising:
information read means for reading predetermined information, other than image information, which is recorded on a film, image read means for reading an illuminated film image, metering means for metering the illuminated film image, switching means for switching metering areas of the metering means for the film image, and control means for, when the read predetermined information includes backlight determination information in photographing operation, controlling the switching means to switch the metering areas for the film image in accordance with the backlight determination information.

A film image read apparatus of the present invention, according to its fourth aspect, is characterized by comprising:
information read means for reading predetermined information, other than image information, which is recorded on a film, image read means for reading an illuminated film image, metering means for metering the illuminated film image, switching means for switching metering areas of the metering means for the film image, and control means for, when the read predetermined information includes exposure correction amount information in photographing operation, controlling the switching means to switch the metering areas for the film image in accordance with the exposure correction amount information.

A method of controlling a film image read apparatus of the present invention is characterized as follows according to its first aspect.

There is provided a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, comprising: when the read predetermined information includes metering mode information for photographing operation, switching the metering areas for the film image in accordance with the metering mode information.

A method of controlling a film image read apparatus of the present invention is characterized as follows according to its second aspect.

There is provided a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, comprising: when the read predetermined information includes flash information indicating whether flash means was used in photographing operation, switching the metering areas for the film image in accordance with the flash information.

A method of controlling a film image read apparatus of the present invention is characterized as follows according to its third aspect.

There is provided a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, comprising: when the read predetermined information includes backlight determination information in photographing operation, switching the metering areas for the film image in accordance with the backlight determination information.

A method of controlling a film image read apparatus of the present invention is characterized as follows according to its fourth aspect.

There is provided a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, comprising: when the read predetermined information includes exposure correction amount information in photographing operation, switching the metering areas for the film image in accordance with the exposure correction amount information.

A storage medium of the present invention is characterized as follows according to its first aspect.

There is provided a storage medium storing a control program for controlling a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, the control program comprising a code of the step of, when the read predetermined information includes metering mode information in photographing operation, switching the metering areas for the film image in accordance with the metering mode information.

A storage medium of the present invention is characterized as follows according to its second aspect.

There is provided a storage medium storing a control program for controlling a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, the control program comprising a code of the step of, when the read predetermined information includes flash information indicating whether flash means was used in photographing operation, switching the metering areas for the film image in accordance with the flash information.

A storage medium of the present invention is characterized as follows according to its third aspect.

There is provided a storage medium storing a control program for controlling a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, the control program comprising a code of the step of, when the read predetermined information includes backlight determination information in photographing operation, switching the metering areas for the film image in accordance with the backlight determination information.

A storage medium of the present invention is characterized as follows according to its fourth aspect.

There is provided a storage medium storing a control program for controlling a method of controlling a film image read apparatus including information read means for reading predetermined information, other than image information, which is recorded on a film, image read means for reading an illuminated film image, metering means for metering the illuminated film image, and switching means for switching metering areas of the metering means for the film image, the control program comprising a code of the step of, when the read predetermined information includes exposure correction amount information in photographing operation, switching the metering areas for the film image in accordance with the exposure correction amount information.

An image processing apparatus of the present invention is characterized by comprising:
read means for reading image information and exposure condition data in a photograph operation from a storage medium, and image processing means for performing a predetermined image processing operation on image information in predetermined different image areas on the basis of the exposure condition data read by the read means.

An image processing method of the present invention is characterized by comprising the steps of:
reading image information and exposure condition data in a photograph operation from a storage medium, and performing a predetermined image processing operation on image information in predetermined different image areas on the basis of the exposure condition data read in the step of reading.

A storage medium of the present invention is characterized as follows according to its fifth aspect.

There is provided a storage medium storing a control program for image processing, the control program comprising: a code of the step of reading image information and exposure condition data in a photograph operation from a storage medium, and a code of the step of performing a predetermined image processing operation on image information in predetermined different image areas on the basis of the exposure condition data read in the step of reading.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS (First Embodiment)

In this embodiment, metering mode information of IX information (predetermined information other than image data, which is magnetically recorded on a magnetic recording portion) is used. Note that a method of recording predetermined data other than image data includes a method of recording predetermined data outside an image area by using optical bar codes.

Figure 1:
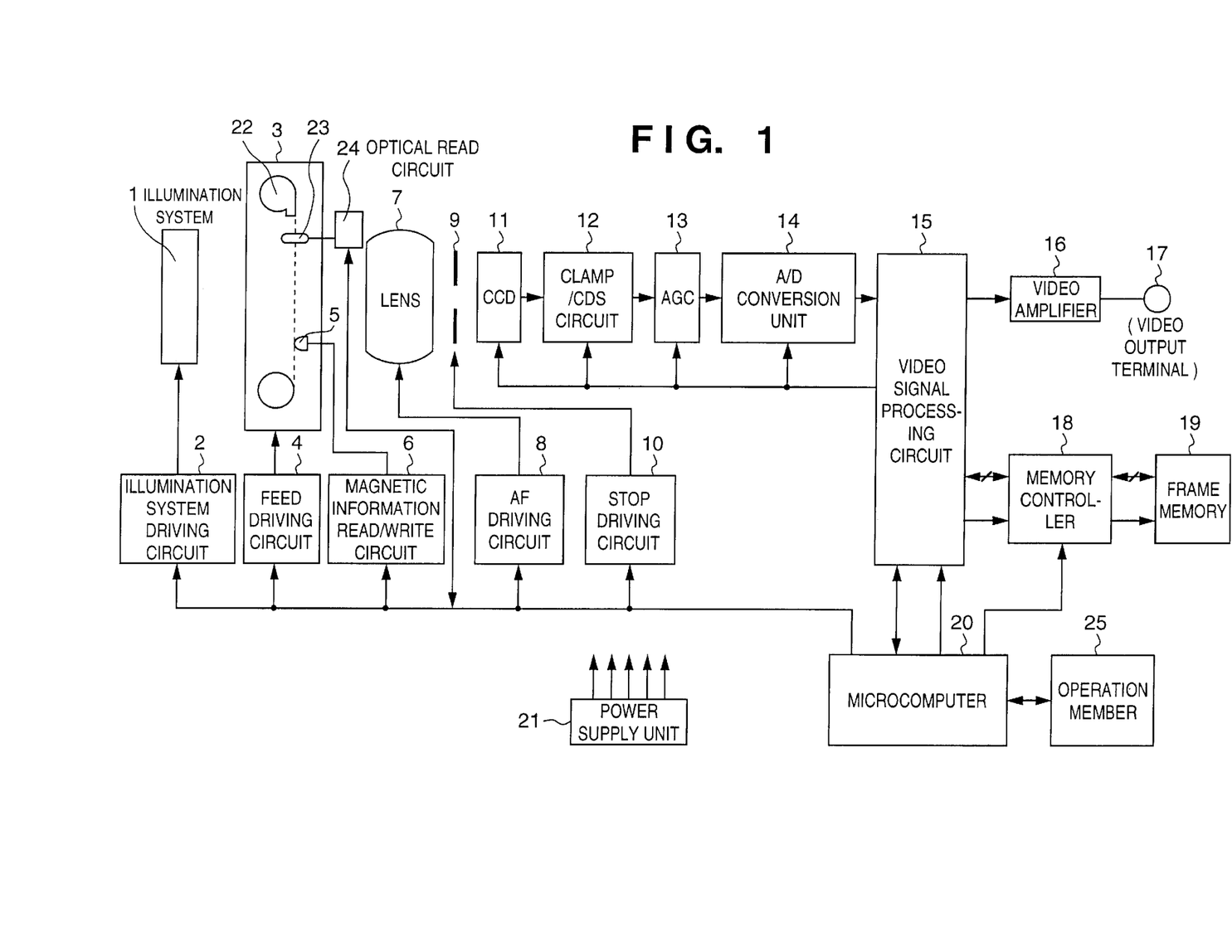
FIG. 1 is a block diagram showing the internal arrangement of a film image read apparatus according to the first embodiment of the present invention.

FIG. 1 is a block diagram showing the internal arrangement of a film image read apparatus according to the first embodiment of the present invention.

Referring to FIG. 1, reference numeral 1 denotes an illumination system positioned on the opposite side of a film to a CCD 11. The illumination system 1 is driven and turned on by an illumination system driving circuit 2 to illuminate the film in accordance with an instruction from a microcomputer 20.

A feed driving circuit 4 is controlled by the microcomputer 20 to pull out the exposed film from a cartridge 22 and move it to a predetermined position. This feeding position is controlled by detecting the perforations in the film using an optical detection element 23 and an optical read circuit 24.

A magnetic information read/write circuit 6 is controlled by the microcomputer 20 to read/write magnetically recorded information from/on the exposed film by using a head unit 5.

As an image sensing element, the CCD 11 is used. The film image formed on this image sensing element through an optical lens 7 is photoelectrically converted to be extracted as an electrical signal.

A clamp/CDS circuit 12 and an AGC 13 perform basic analog signal processing for the signal before A/D conversion. The clamp level and the AGC reference level can be changed by the microcomputer 20.

An A/D conversion unit 14 converts the analog CCD output signal into a digital signal.

A video signal processing circuit 15 performs filtering, color conversion, and gamma/knee processing for the digital CCD image data, and outputs the resultant data to a memory controller 18. This video signal processing circuit 15 also incorporates a D/A conversion unit (not shown) and can convert the video signal input from the CCD 11 or the image data input from the memory control circuit 18 into an analog signal. This analog signal can be output to a monitor or the like through a video output terminal 17 of a video amplifier 16. These functions are switched by data exchange with the microcomputer 20. Exposure information, focus information, white balance information, and auto-focus information for the CCD signal can be output to the microcomputer 20, as needed. The microcomputer 20 adjusts the white balance and gain of the signal on the basis of these pieces of information. In addition, the metering modes (metering areas) can be switched in accordance with an instruction from the microcomputer 20.

The memory controller 18 stores the digital image data input from the video signal processing circuit 15 in a frame memory 19, or outputs image data from the frame memory 19 to the video signal processing circuit 15. In addition, the memory controller 18 thins out image information and transfers the resultant information to the frame memory 19 during index window display in accordance with an instruction from the microcomputer 20.

The frame memory 19 is an image memory capable of storing at least data corresponding to an index window and one or more image windows. In general, a VRAM, an SRAM, a DRAM, or an SDRAM is used. In this system, fixed image data such as character data can be stored in this memory in addition to the image data read from the CCD 11.

A stop driving circuit 10 is constituted by, for example, an auto iris and the like, and changes the optical aperture value by driving a stop 9 under the control of the microcomputer 20.

An AF (Auto Focus) driving circuit 8 includes, for example, a stepping motor, and forms an in-focus image on the film by changing the position of the focusing lens in the lens 7.

A power supply unit 21 supplies necessary power to each IC and each driving system.

An operation member 25 transfers information indicating its own state to the microcomputer 20. The microcomputer 20 controls the respective units in accordance with a change in the state of the operation member 25.

In the film image read apparatus having the above arrangement, the head unit 5 and the magnetic information read/write circuit 6 construct an information read means for reading predetermined information magnetically recorded on a film, the optical lens 7, the AF driving circuit 8, the stop 9, the stop driving circuit 10, the CCD 11, the clamp/CDS circuit 12, the AGC circuit 13, the A/D conversion unit 14, and the video signal processing circuit 15 construct an image read means for reading a film image, the video signal processing circuit 15 and the microcomputer 20 construct a metering means for metering a film image, and the microcomputer 20 serves as a switching means for switching metering areas for a film image.

The basic operation of the film image read apparatus having the above arrangement will be briefly described next with reference to the flow chart of FIG. 2.

In step S100, the operation is started.

It is then checked in step S101 whether an IX240 film (a film having a magnetic recording portion) is loaded into the apparatus. If NO in step S101, the flow advances to step S112. If YES in step S101, the flow advances to step S102 to reproduce the images on the film.

Figure 2:
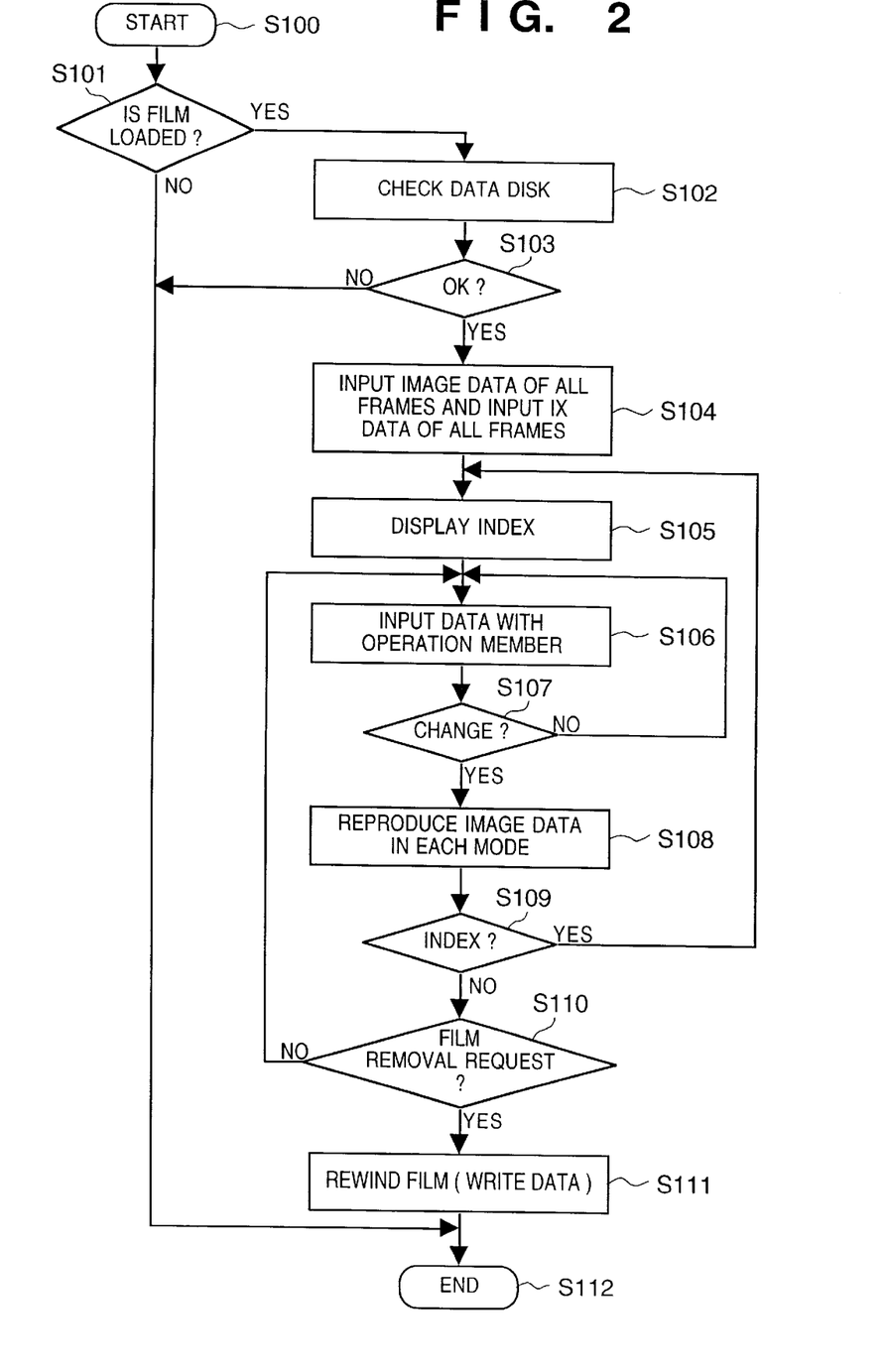
FIG. 2 is a flow chart showing the basic operation of the film image read apparatus in FIG. 1.
Figure 3:
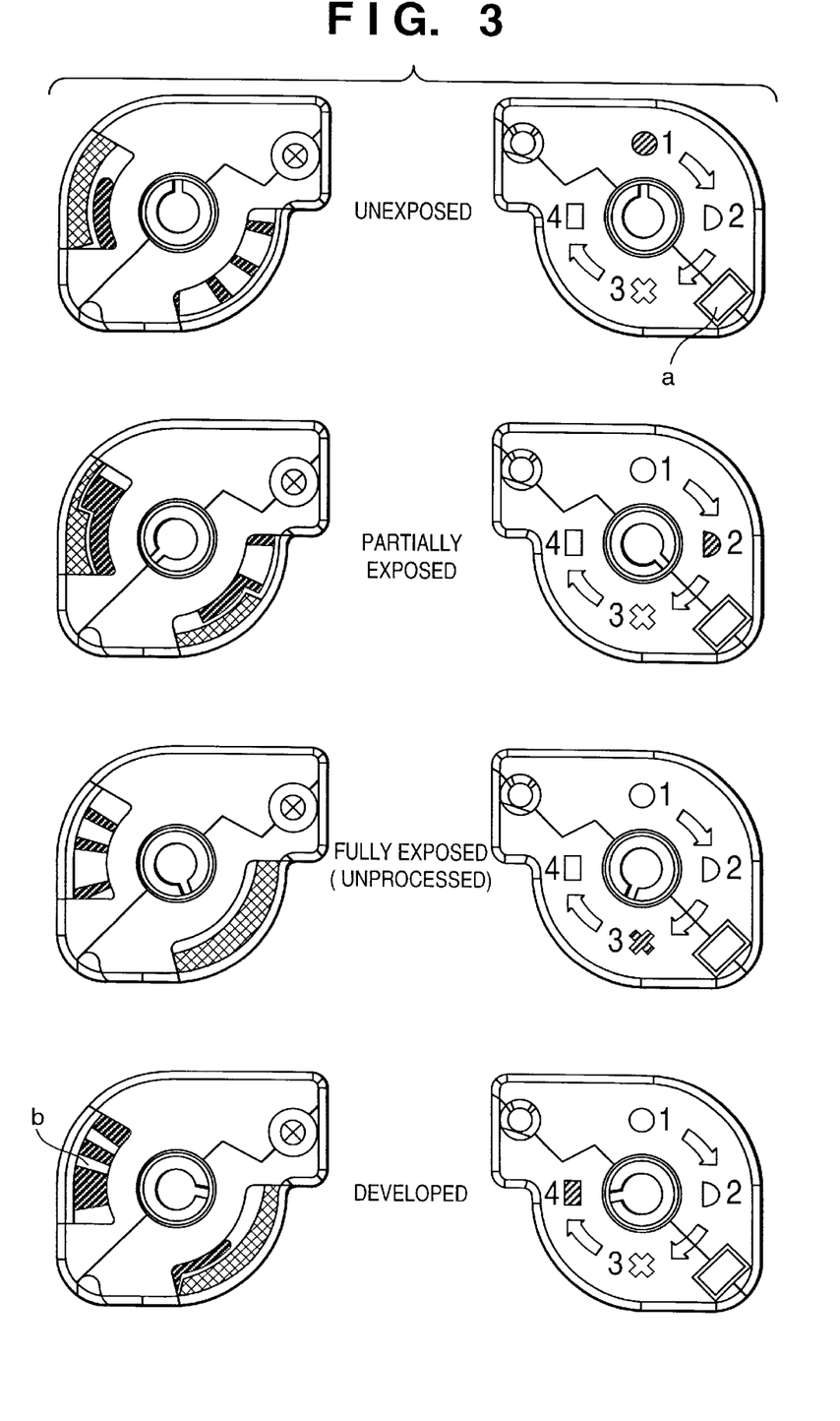
FIG. 3 is a view showing the state of a film cartridge.

In step S102, a data disk b and a developed state indication tab a in FIG. 3 are checked to determine whether the film is a developed film, a color negative film, a color positive film, a monochrome film, or a cleaning cartridge. This check is performed by using, for example, a switch or photoreflector (not shown).

If the check result in step S102 indicates in step S103 that the film is an undeveloped film, reproduction is inhibited, and the flow advances to step S112. If the film is a developed film, the flow advances to step S104.

In step S104, the feed driving circuit 4 is used to open the cover of the film cartridge to pull out the film, and the images of all the frames are read by the CCD 11. At the same time, the IX data (magnetically recorded information) on all the frames are loaded by using the magnetic information read/write circuit 6. The image data read by the CCD 11 suffices to be coarse data because they are used for an index window. For this reason, the image data is stored in the frame memory 19 after the data amount is decreased by thinning processing. In this case, a dedicated area for storing the index window data is ensured in the frame memory 19. Ensuring such a dedicated area obviates the necessity of reading the images of all the frames every time an index window is displayed.

In step S105, the image data loaded in step S104 is output as index image data to the video amplifier 16.

In step S106, it is checked whether any data is input from the operation member 25.

If the check result in step S106 indicates in step S107 that there is a change in input, the flow advances to step S108. If there is no change in input, the flow returns to step S106.

In step S108, image data is loaded from the CCD 11, and the reproducing modes are switched in accordance with the change of the operation member. For example, a programmed automatic reproduction mode and a mode of reproducing frames one by one, and the like are switched. In the frame-by-frame reproduction mode, frame feed is performed. An index window display request is checked in step S109. In this case, the IX data, the photography data, the title, and the data is displayed in accordance with a request. In addition, the display is switched in accordance with a change in orientation and a change in aspect ratio.

In step S109, it is checked whether an index window display request is generated. If YES in step S109, the flow returns to step S105 to display an index window. If NO in step S109, the flow advances to step S110.

In step S110, it is checked whether a film removal request is generated. If NO in step S110, the flow returns to step S106. If YES in step S110, the flow advances to step S111 to rewind the film.

In step S111, the film is rewound by using the feed driving circuit 4, the position of the data disk b is set to the "developed" position, and the cover of the cartridge is closed, thereby allowing removal of the film. In addition, information is magnetically recorded on the film by using the magnetic information read/write circuit 6 and the head unit 5, as needed, while the film is rewound.

In step S112, the operation is terminated.

Figure 4:
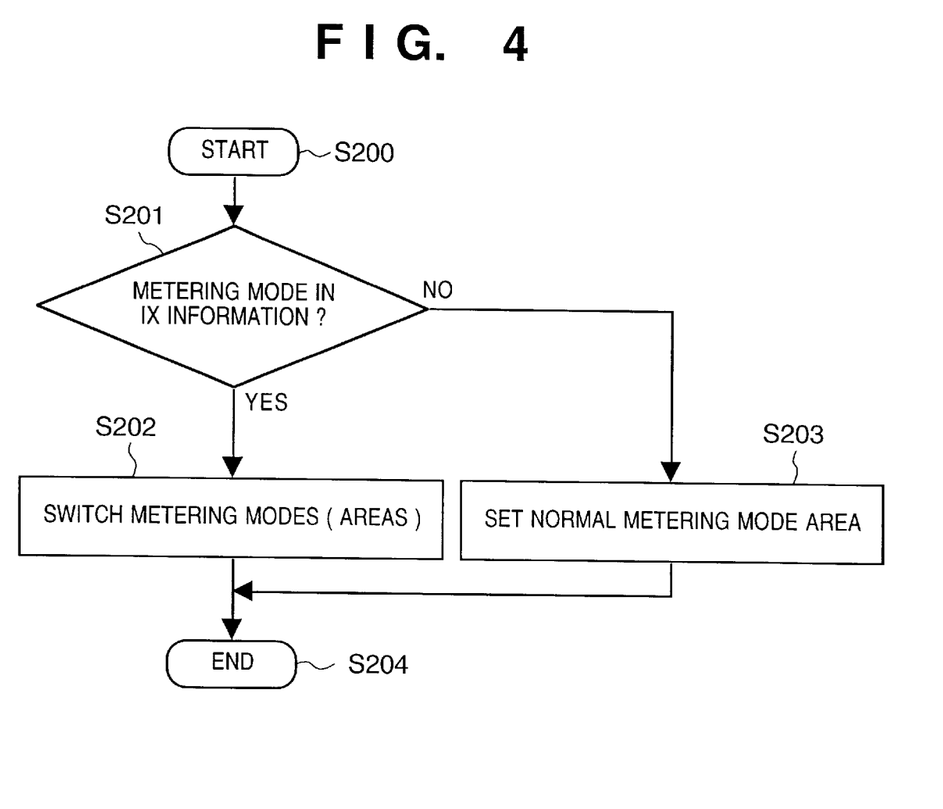
FIG. 4 is a flowchart showing the operation of the first embodiment.

This embodiment will be described next with reference to the flow chart of FIG. 4.

First of all, the operation is started in step S200.

In step S201, it is checked whether the magnetic information (IX data) read in step S104 in FIG. 2 includes metering mode information corresponding to the current image to be reproduced. If YES in step S201, the flow advances to step S202. If NO in step S201, the flow advances to step S203.

In step S202, AE (Automatic Exposure) in film image data loading operation is performed by metering in a metering mode area corresponding to the metering mode information upon photographing operation in the IX information.

In step S203, AE in film image data loading operation is performed by metering in the initially set metering mode area.

The operation is terminated in step S204.

As described above, in this embodiment, with the above processing, if metering mode information is contained in IX information, a film image can be reproduced on the TV screen in accordance with the intention of the photographer more faithfully.

(Second Embodiment)

In this embodiment, flash (flash means) information in IX information is used. Note that the arrangement of the apparatus of the second embodiment is the same as that of the first embodiment.

Figure 5:
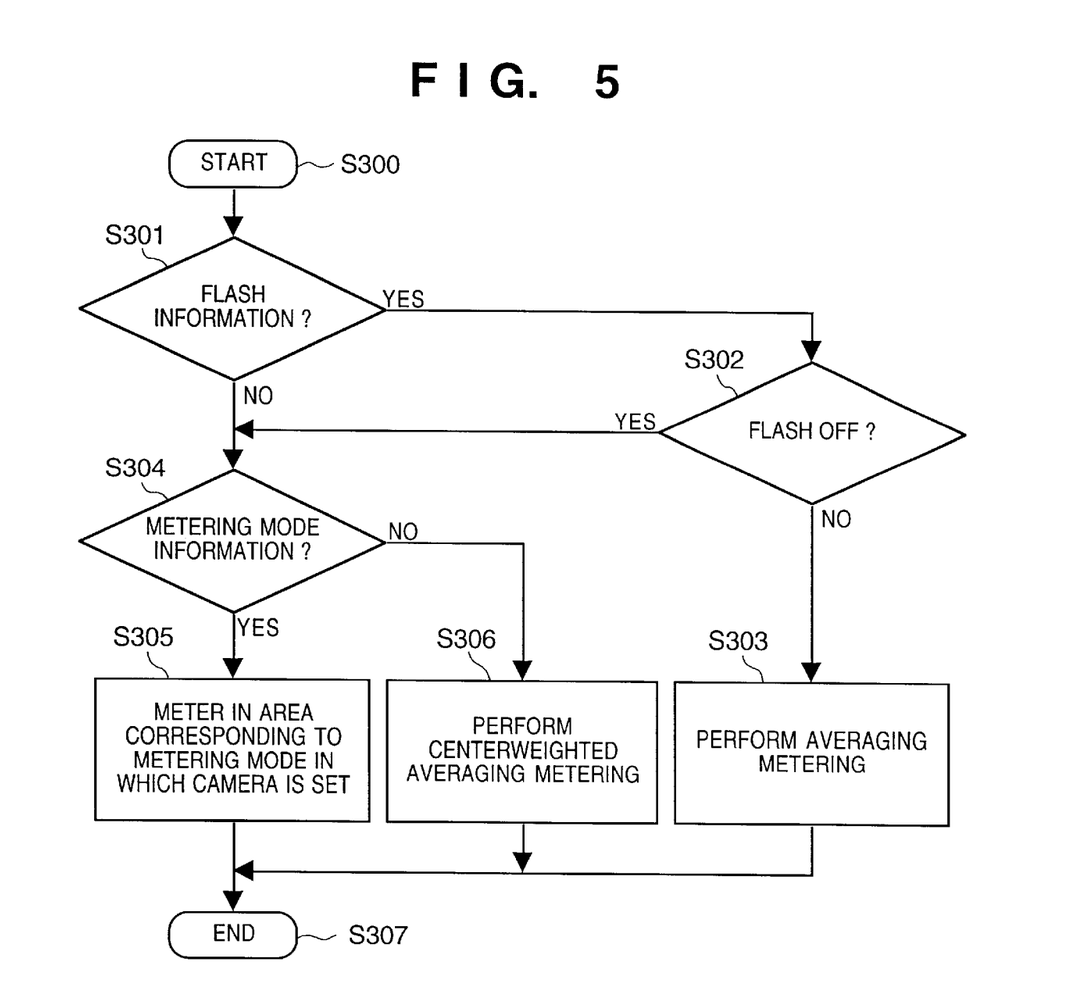
FIG. 5 is a flow chart showing the operation of the second embodiment.

This embodiment will be described below with reference to the flow chart of FIG. 5.

First of all, in step S300, the operation is started.

It is then checked in step S301 whether the magnetic information read in step S104 in FIG. 2 includes flash information (indicating whether a flash was used or not) corresponding to the image to be currently reproduced. If YES in step S301, the flow advances to step S302. If NO in step S301, the flow advances to step S304.

In step S302, it is checked on the basis of the flash information in the IX information whether a flash was used. If YES in step S302, the flow advances to step S303. If NO in step S302, the flow advances to step S304.

In step S303, AE in film image data loading operation is performed with averaging metering.

In step S304, it is checked whether the magnetic information read in step S104 in FIG. 2 includes metering mode information corresponding to the image to be currently reproduced. If YES in step S304, the flow advances to step S305. If NO in step S304, the flow advances to step S306.

In step S305, AE in film image data loading operation is performed by metering in a metering mode area corresponding to the metering mode information upon photographing operation in the IX information.

The processing is terminated in step S307.

In this embodiment, with the above processing, if both metering mode information and flash mode information are contained in IX information, a film image can be reproduced on the TV screen in accordance with the intention of the photographer more faithfully.

(Third Embodiment)

In this embodiment, backlight information in IX information is also used. Note that the arrangement of the apparatus of the third embodiment is the same as that of the first embodiment.

Figure 6:
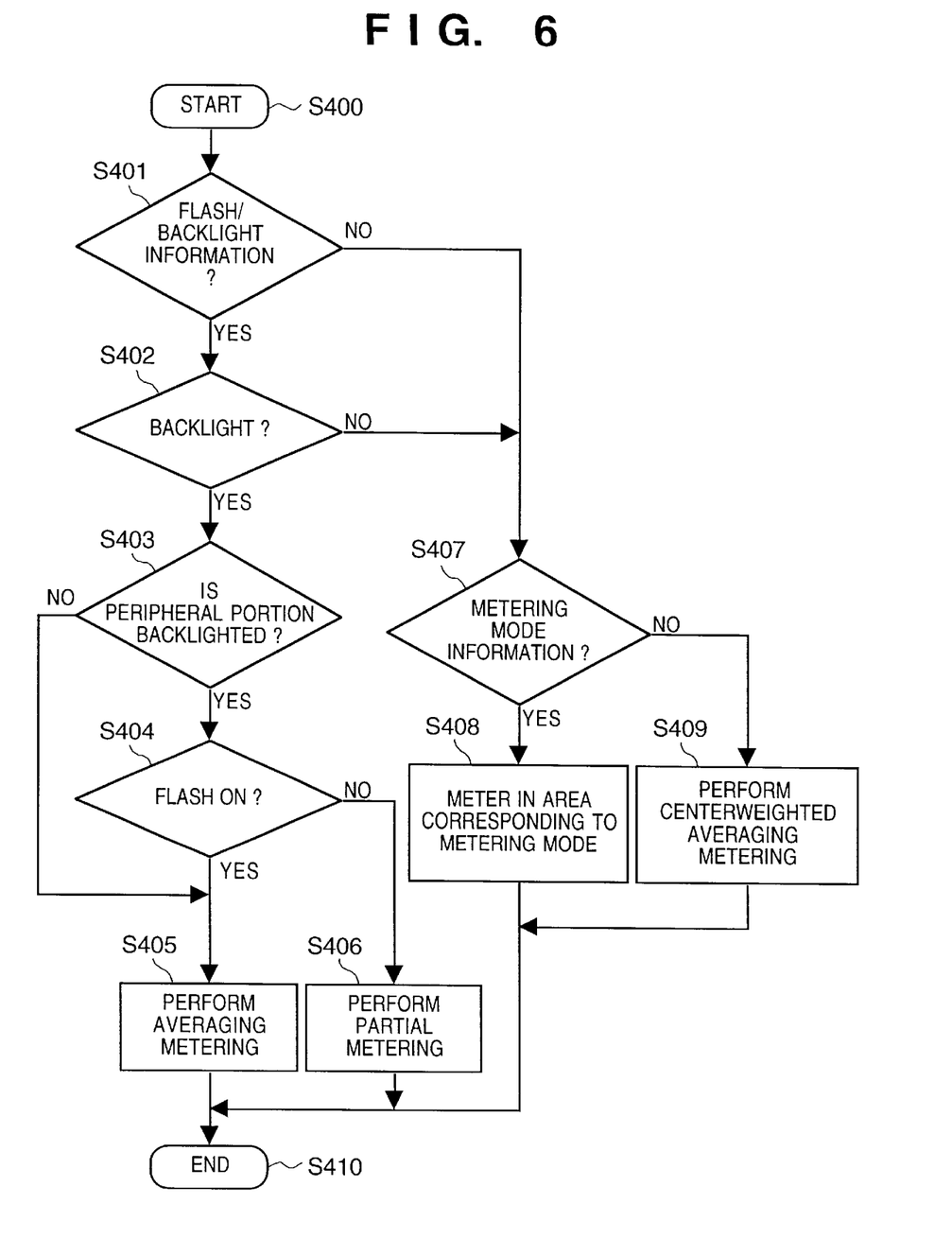
FIG. 6 is a flow chart showing the operation of the third embodiment.

This embodiment will be described below with reference to the flow chart of FIG. 6.

First of all, in step S400, the operation is started.

It is then checked in step S401 whether the magnetic information read in step S104 in FIG. 2 includes flash information (indicating whether a flash was used or not) and backlight information (indicating that the object is not backlighted/the central portion is backlighted/the peripheral portion is backlighted) corresponding to the image to be currently reproduced. If YES in step S401, the flow advances to step S402. If NO in step S401, the flow advances to step S407.

In step S402, it is checked whether the backlight information in the IX information indicates backlight. If YES in step S402, the flow advances to step S403. If NO in step S402, the flow advances to step S407.

In step S403, the type of backlight is determined. If the backlight information in the IX information indicates that the peripheral portion is backlighted, the flow advances to step S404. If the backlight information indicates that the central portion is backlighted, the flow advances to step S405.

In step S404, it is checked from the flash information in the IX information whether a flash was used. If YES in step S404, the flow advances to step S405. If NO in step S404, the flow advances to step S406.

In step S405, AE in film image data loading operation is performed by averaging metering.

In step S406, AE in film image data loading operation is performed by partial metering.

In step S407, it is checked whether the magnetic information read in step S104 in FIG. 2 includes metering mode information corresponding to the image to be currently reproduced. If YES in step S407, the flow advances to step S408. If NO in step S407, the flow advances to step S409.

In step S408, AE in film image data loading operation is performed by metering in a metering area corresponding to the metering mode information upon photographing operation in the IX information.

In step S409, AE in film image data loading operation is performed by centerweighted metering.

The processing is terminated in step S410.

As described above, in this embodiment, with the above processing, if backlight information is contained in IX information together with metering mode information and flash mode information, a film image can be reproduced on the TV screen in accordance with the intention of the photographer more faithfully.

(Fourth Embodiment)

In this embodiment, exposure correction amount information in IX information is used. Note that the arrangement of the apparatus of the fourth embodiment is the same as that of the first embodiment.

Figure 7:
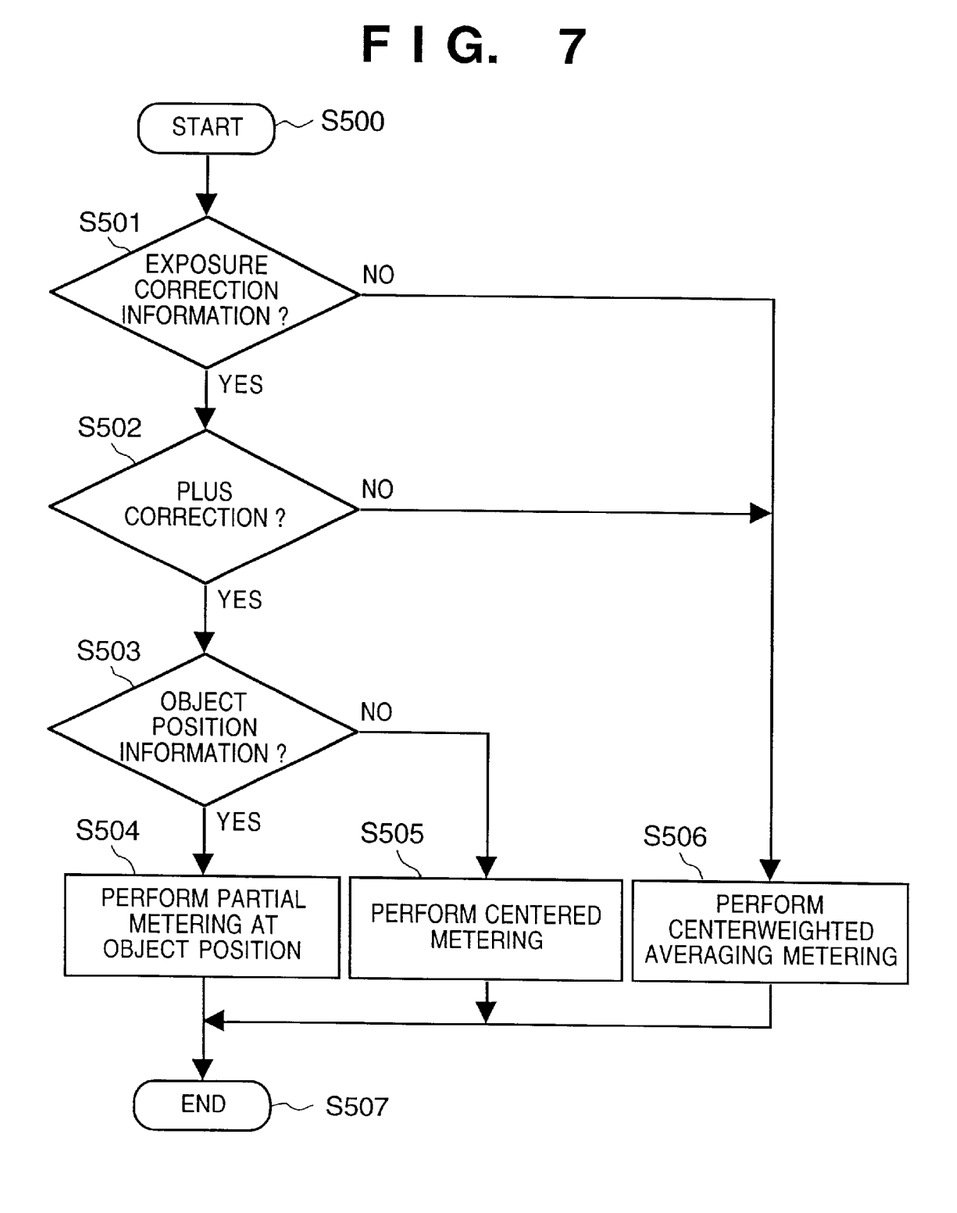
FIG. 7 is a flow chart showing the operation of the fourth embodiment.

This embodiment will be described below with reference to the flow chart of FIG. 7.

First of all, in step S500, the operation is started.

It is then checked in step S501 whether the magnetic information read in step S104 in FIG. 2 includes exposure correction amount information corresponding to the current image to be reproduced. If YES in step S501, the flow advances to step S502. If NO in step S501, the flow advances to step S506.

In step S502, it is checked whether the exposure correction information in the IX information indicates plus correction. If YES in step S502, the flow advances to step S503. If NO in step S502, the flow advances to step S506.

In step S503, it is checked whether the magnetic information read in step S104 in FIG. 2 includes object position/size information corresponding to the current image to be reproduced. If YES in step S503, the flow advances to step S504. If NO in step S503, the flow advances to step S505.

In step S504, AE in film image data loading operation is performed by metering (partial metering) in an area corresponding to the object position/size information.

In step S505, AE in film image data loading operation is performed by partial metering in the central portion.

In step S506, AE in film image data loading operation is performed by centerweighted metering.

The processing is terminated in step S507.

As described above, in this embodiment, with the above processing, if exposure correction amount information is contained in IX information, a film image can be reproduced on the TV screen in accordance with the intention of the photographer more faithfully.

(Another Embodiment)

The objects of the present invention are also achieved by supplying a storage medium, which records program codes of a software program that can realize the functions of the above-mentioned embodiments, to the system or apparatus, and reading out and executing the program codes stored in the storage medium by a computer (or a CPU or MPU) of the system or apparatus.

In this case, the program codes themselves read out from the storage medium realize the functions of the above-mentioned embodiments, and the storage medium which stores the program codes constitutes the present invention.

As the storage medium for supplying the program codes, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program codes by the computer but also by some or all of actual processing operations executed by an OS (operating system) running on the computer on the basis of an instruction of the program codes.

Furthermore, the functions of the above-mentioned embodiments may be realized by some or all of actual processing operations executed by a CPU or the like arranged in a function extension board or a function extension unit, which is inserted in or connected to the computer, after the program codes read out from the storage medium are written in a memory of the extension board or unit.

The present invention is not limited to these embodiments, and any modification can be made as long as the functions of the mechanisms and the arrangements of the embodiments can be realized.

As has been described above, according to the present invention, a film image can be reproduced on a monitor in accordance with the intention of the photographer more faithfully.

The present invention is not limited to the above embodiments and various changes and modifications and be made within the spirit and scope of the present invention. Therefore, to apprise the public of the scope of the present invention the following claims are made.

What is claimed is:

1. An image processing apparatus comprising:
   an information reading device for reading, from a storage medium, both image information of an image and exposure condition information for a predetermined metering area of the image obtained in a photographic operation; and,
   an image processing device for switching to a desired metering area selected from a plurality of switchable metering areas in the image, for metering within said desired metering area, and for performing a predetermined image processing operation on the image information, on the basis of the exposure condition information read by said reading device.

2. The apparatus according to claim 1, wherein said storage medium includes a film.

3. The apparatus according to claim 2, wherein said film includes a silver halide film.

4. The apparatus according to claim 1, wherein the exposure condition information includes data indicating a metering mode.

5. The apparatus according to claim 1, wherein the exposure condition information includes data about the use of a flash unit.

6. The apparatus according to claim 1, wherein the exposure condition information includes data about backlight.

7. The apparatus according to claim 1, wherein the exposure condition information includes data about exposure correction.

8. The apparatus according to claim 1, wherein the image processing device is adapted for calculating predetermined metering information from an image signal.

9. An image processing method comprising the steps of:
   reading, from a storage medium, both image information of an image and exposure condition information for a predetermined metering area of the image obtained in a photographic operation;

switching to a desired metering area selected from a plurality of switchable metering areas in the image, metering within said desired metering area; and, performing a predetermined image processing operation on the image information, on the basis of the exposure condition information read in the step of reading.

10. The method according to claim 9, wherein said storage medium includes a film.

11. The method according to claim 10, wherein said film includes a silver halide film.

12. The method according to claim 9, wherein the exposure condition information includes data indicating a metering mode.

13. The method according to claim 9, wherein the exposure condition information includes data about the use of a flash unit.

14. The method according to claim 9, wherein the exposure condition information includes data about backlight.

15. The method according to claim 9, wherein the exposure condition information includes data about exposure correction.

16. The method according to claim 9, wherein the image processing operation includes calculating predetermined metering information from a image signal.

17. A program storage medium storing a control program for image processing, the control program comprising:

a code for reading, from an image storage medium, both image information of an image and exposure condition information for a predetermined metering area of the image obtained in a photographic operation;

a code for switching to a desired metering area selected from a plurality of switchable metering areas in the image, and for metering within said desired metering area; and, a code for performing a predetermined image processing operation on the image information, on the basis of the exposure condition information read in the step of reading.

18. The program storage medium according to claim 17, wherein said image storage medium includes a film.

19. The program storage medium according to claim 18, wherein said film includes a silver halide film.

20. The program storage medium according to claim 17, wherein the exposure condition information includes data indicating a metering mode.

21. The program storage medium according to claim 17, wherein the exposure condition information includes data about the use of a flash unit.

22. The program storage medium according to claim 17, wherein the exposure condition information includes data about backlight.

23. The program storage medium according to claim 17, wherein the exposure condition information includes data about exposure correction.

24. The program storage medium according to claim 17, wherein the image processing operation is adapted for calculating predetermined metering information from an image signal.

* * * * *